(12) United States Patent
Bodtker et al.

(10) Patent No.: US 10,160,477 B2
(45) Date of Patent: Dec. 25, 2018

(54) ELECTRIC POWER STEERING COLUMN ASSEMBLY (71) Applicant: Steering Solutions IP Holding Corporation, Saginaw, MI (US)

(72) Inventors: Joen C. Bodtker, Gaines, MI (US); Donald A. Buzzard, Saginaw, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 15/225,315

(22) Filed: Aug. 1, 2016

(65) Prior Publication Data

US 2018/0029632 A1    Feb. 1, 2018

(51) Int. Cl.
*B62D 5/00* (2006.01)
*B62D 1/16* (2006.01)

(52) U.S. Cl.
CPC ............. *B62D 5/001* (2013.01); *B62D 1/16* (2013.01); *B62D 5/005* (2013.01)

(58) Field of Classification Search
CPC .................................................. B62D 5/001
See application file for complete search history.

(56) References Cited

U.S. PATENT DOCUMENTS

| | | |
|---|---|---|
| 3,420,586 A | 1/1969 | Gerner |
| 4,315,117 A | 2/1982 | Kokubu et al. |
| 4,337,967 A | 7/1982 | Yoshida et al. |
| 4,503,300 A | 3/1985 | Lane, Jr. |
| 4,503,504 A | 3/1985 | Suzumura et al. |
| 4,561,323 A | 12/1985 | Stromberg |
| 4,691,587 A | 9/1987 | Farrand et al. |
| 4,836,566 A | 6/1989 | Birsching |
| 4,921,066 A | 5/1990 | Conley |
| 4,962,570 A | 10/1990 | Hosaka et al. |
| 4,967,618 A | 11/1990 | Matsumoto et al. |
| 5,240,284 A | 8/1993 | Takada et al. |
| 5,295,712 A | 3/1994 | Omura |
| 5,319,803 A | 6/1994 | Allen |
| 5,488,555 A | 1/1996 | Asgari et al. |
| 5,618,058 A | 4/1997 | Byon |
| 5,668,721 A | 9/1997 | Chandy |

(Continued)

FOREIGN PATENT DOCUMENTS

| | | |
|---|---|---|
| CN | 1722030 A | 1/2006 |
| CN | 1736786 A | 2/2006 |

(Continued)

OTHER PUBLICATIONS

Chinese Office Action and Search Report for Chinese Application No. 2016103666609.X dated Dec. 20, 2017, 8 pages.

(Continued)

*Primary Examiner* — Kevin Hurley
(74) *Attorney, Agent, or Firm* — Cantor Colburn LLP (57) ABSTRACT

An electric power steering column assembly includes a steering shaft and a travel stop assembly. The steering shaft has a first end that is configured to attach to a steering wheel. The steering shaft has a second end that extends through a steering actuator. The travel stop assembly engages the second end of the steering shaft. The travel stop assembly is configured to inhibit rotation of the steering shaft.

19 Claims, 4 Drawing Sheets

(56) References Cited

U.S. PATENT DOCUMENTS

| | | |
|---|---|---|
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,138,788 A * | 10/2000 | Bohner .............. B62D 5/006 180/402 |
| 6,170,862 B1 | 1/2001 | Hoagland et al. |
| 6,212,453 B1 | 4/2001 | Kawagoe et al. |
| 6,227,571 B1 | 5/2001 | Sheng et al. |
| 6,256,561 B1 | 7/2001 | Asanuma |
| 6,301,534 B1 | 10/2001 | McDermott, Jr. et al. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,481,526 B1 * | 11/2002 | Millsap .............. B62D 5/006 180/402 |
| 6,575,263 B2 | 6/2003 | Hjelsand et al. |
| 6,578,449 B1 | 6/2003 | Anspaugh et al. |
| 6,598,695 B1 * | 7/2003 | Menjak .............. B62D 5/001 180/402 |
| 6,612,392 B2 | 9/2003 | Park et al. |
| 6,612,393 B2 | 9/2003 | Bohner et al. |
| 6,778,890 B2 | 8/2004 | Shimakage et al. |
| 6,799,654 B2 * | 10/2004 | Menjak .............. B62D 5/006 180/402 |
| 6,817,437 B2 * | 11/2004 | Magnus .............. B62D 5/006 180/403 |
| 6,819,990 B2 | 11/2004 | Ichinose |
| 6,820,713 B2 * | 11/2004 | Menjak .............. B62D 5/006 180/402 |
| 7,018,299 B2 | 3/2006 | Da Silva |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,150,581 B2 | 4/2012 | Iwazaki et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,452,492 B2 | 5/2013 | Buerkle et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,632,096 B1 | 1/2014 | Quinn et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,725,230 B2 | 5/2014 | Lisseman et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,159,221 B1 | 10/2015 | Stantchev |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,865 B2 | 6/2016 | Yopp |
| 9,725,098 B2 | 8/2017 | Abou-Nasr et al. |
| 9,810,727 B2 | 11/2017 | Kandler et al. |
| 9,852,752 B1 | 12/2017 | Chou et al. |
| 9,868,449 B1 | 1/2018 | Holz et al. |
| 9,878,732 B2 | 1/2018 | Urushibata |
| 2003/0046012 A1 | 3/2003 | Yamaguchi |
| 2003/0094330 A1 | 5/2003 | Boloorchi et al. |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano et al. |
| 2005/0081675 A1 | 4/2005 | Oshita et al. |
| 2005/0155809 A1 | 7/2005 | Krzesicki et al. |
| 2005/0197746 A1 | 9/2005 | Pelchen et al. |
| 2005/0275205 A1 | 12/2005 | Ahnafield |
| 2006/0224287 A1 | 10/2006 | Izawa et al. |
| 2006/0244251 A1 | 11/2006 | Muller |
| 2006/0271348 A1 | 11/2006 | Rossow et al. |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 | 10/2008 | Kumar et al. |
| 2009/0024278 A1 | 1/2009 | Kondo et al. |
| 2009/0189373 A1 | 7/2009 | Schramm et al. |
| 2009/0256342 A1 | 10/2009 | Cymbal et al. |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0222976 A1 | 9/2010 | Haug |
| 2010/0228417 A1 | 9/2010 | Lee et al. |
| 2010/0228438 A1 | 9/2010 | Buerkle et al. |
| 2010/0280713 A1 | 11/2010 | Stahlin et al. |
| 2010/0286869 A1 | 11/2010 | Katch et al. |

(56) References Cited

U.S. PATENT DOCUMENTS

| | | |
|---|---|---|
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |
| 2012/0150388 A1 | 6/2012 | Boissonnier et al. |
| 2012/0197496 A1 | 8/2012 | Limpibunterng et al. |
| 2012/0205183 A1 | 8/2012 | Rombold |
| 2012/0209473 A1 | 8/2012 | Birsching et al. |
| 2012/0215377 A1 | 8/2012 | Takemura et al. |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0218396 A1 | 8/2013 | Moshchuk et al. |
| 2013/0233117 A1 | 9/2013 | Read et al. |
| 2013/0253765 A1 | 9/2013 | Bolourchi et al. |
| 2013/0292955 A1 | 11/2013 | Higgins et al. |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kauffman et al. |
| 2014/0111324 A1 | 4/2014 | Lisseman et al. |
| 2014/0152551 A1 | 6/2014 | Mueller et al. |
| 2014/0156107 A1 | 6/2014 | Karasawa et al. |
| 2014/0168061 A1 | 6/2014 | Kim |
| 2014/0172231 A1 | 6/2014 | Terada et al. |
| 2014/0277896 A1 | 9/2014 | Lathrop et al. |
| 2014/0277945 A1 | 9/2014 | Chandy |
| 2014/0300479 A1 | 10/2014 | Wolter et al. |
| 2014/0309816 A1 | 10/2014 | Stefan et al. |
| 2014/0354568 A1 | 12/2014 | Andrews et al. |
| 2015/0002404 A1 | 1/2015 | Hooton |
| 2015/0006033 A1 | 1/2015 | Sekiya |
| 2015/0014086 A1 | 1/2015 | Eisenbarth |
| 2015/0032322 A1 | 1/2015 | Wimmer |
| 2015/0032334 A1 | 1/2015 | Jang |
| 2015/0051780 A1 | 2/2015 | Hahne |
| 2015/0060185 A1 | 3/2015 | Feguri |
| 2015/0120141 A1 | 4/2015 | Lavoie et al. |
| 2015/0120142 A1 | 4/2015 | Park et al. |
| 2015/0123947 A1 | 5/2015 | Jubner et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |
| 2015/0338849 A1 | 11/2015 | Nemec et al. |
| 2016/0009332 A1 | 1/2016 | Sirbu |
| 2016/0075371 A1 | 3/2016 | Varunjikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka et al. |
| 2016/0229450 A1 | 8/2016 | Basting et al. |
| 2016/0231743 A1 | 8/2016 | Bendewald et al. |
| 2016/0291862 A1 | 10/2016 | Yaron et al. |
| 2016/0318540 A1 | 11/2016 | King et al. |
| 2016/0318542 A1 | 11/2016 | Pattok et al. |
| 2016/0347347 A1 | 12/2016 | Lubischer |
| 2016/0347348 A1 | 12/2016 | Lubischer |
| 2016/0355207 A1 | 12/2016 | Urushibata |
| 2016/0362084 A1 | 12/2016 | Martin et al. |
| 2016/0362117 A1 | 12/2016 | Kaufmann et al. |
| 2016/0362126 A1 | 12/2016 | Lubischer et al. |
| 2016/0364003 A1 | 12/2016 | O'Brien |
| 2016/0368522 A1 | 12/2016 | Lubischer et al. |
| 2016/0375860 A1 | 12/2016 | Lubischer et al. |
| 2016/0375923 A1 | 12/2016 | Schulz et al. |
| 2016/0375925 A1 | 12/2016 | Lubischer et al. |
| 2016/0375926 A1 | 12/2016 | Lubischer et al. |
| 2016/0375927 A1 | 12/2016 | Schulz et al. |
| 2016/0375928 A1 | 12/2016 | Magnus |
| 2016/0375929 A1 | 12/2016 | Rouleau et al. |
| 2016/0375931 A1 | 12/2016 | Lubischer |
| 2017/0029009 A1 | 2/2017 | Rouleau |
| 2017/0029018 A1 | 2/2017 | Lubischer |
| 2017/0113712 A1 | 4/2017 | Watz et al. |
| 2017/0151978 A1 | 6/2017 | Oya et al. |
| 2017/0158055 A1 | 6/2017 | Kim et al. |
| 2017/0158222 A1 | 6/2017 | Schulz et al. |
| 2017/0225704 A1 | 8/2017 | Urushibata |
| 2017/0240204 A1 | 8/2017 | Raad et al. |
| 2017/0293306 A1 | 10/2017 | Riefe et al. |
| 2017/0297606 A1 | 10/2017 | Kim et al. |
| 2017/0305458 A1 | 10/2017 | Wang et al. |
| 2017/0356487 A1 | 12/2017 | Muntener et al. |
| 2018/0072341 A1 | 3/2018 | Schulz et al. |
| 2018/0093700 A1 | 4/2018 | Chandy |
| 2018/0105198 A1 | 4/2018 | Bodtker et al. |

FOREIGN PATENT DOCUMENTS

| | | |
|---|---|---|
| CN | 101037117 A | 9/2007 |
| CN | 101041355 A | 9/2007 |
| CN | 101596903 A | 12/2009 |
| CN | 102320324 A | 1/2012 |
| CN | 102452391 A | 5/2012 |
| CN | 202563346 U | 11/2012 |
| CN | 103158699 A | 6/2013 |
| CN | 103419840 A | 12/2013 |
| CN | 103448785 A | 12/2013 |
| CN | 103677253 A | 3/2014 |
| CN | 104024084 A | 9/2014 |
| DE | 19523214 A1 | 1/1997 |
| DE | 19923012 A1 | 11/2000 |
| DE | 10212782 A1 | 10/2003 |
| DE | 102005032528 A1 | 1/2007 |
| DE | 102005056438 A1 | 6/2007 |
| DE | 102006025254 A1 | 12/2007 |
| DE | 102008057313 A1 | 10/2009 |
| DE | 102010025197 A1 | 12/2011 |
| DE | 102012010887 A1 | 12/2013 |
| DE | 102015212857 A1 | 1/2016 |
| EP | 1559630 A2 | 8/2005 |
| EP | 1783719 A2 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 A1 | 5/2005 |
| FR | 3016327 A1 | 7/2015 |
| JP | S60157963 A | 8/1985 |
| JP | S60164629 A | 8/1985 |
| JP | H05162652 A | 6/1993 |
| JP | 2007253809 A | 10/2007 |
| JP | 20174099 A | 1/2017 |
| KR | 20100063433 A | 6/2010 |
| WO | 2006099483 A1 | 9/2006 |
| WO | 2007034567 A1 | 3/2007 |
| WO | 2008120231 A2 | 10/2008 |
| WO | 2010082394 A1 | 7/2010 |
| WO | 2010116518 A1 | 10/2010 |
| WO | 2013080774 A1 | 6/2013 |
| WO | 2013101058 A1 | 7/2013 |

OTHER PUBLICATIONS

English Translation of Chinese Office Action and Search Report for Chinese Application No. 2016103666609.X dated Dec. 20, 2017, 8 pages.

Chinese Office Action & Search Report for Chinese Application No. 201510204221.5 dated Aug. 29, 2016, 5 pages, no English translation available.

(56) References Cited

OTHER PUBLICATIONS

English Translation of Chinese Office Action & Search Report for Chinese Application No. 201610575225.9 dated Jan. 22, 2018, 10 pages.
English Translation of Chinese Office Action and Search Report for Chinese Application No. 201210599006.6 dated Jan. 27, 2015, 9 pages.
English Translation of Chinese Office Action and Search Report for Chinese Application No. 201310178012.9 dated Apr. 13, 2015, 13 pages.
English Translation of Chinese Office Action and Search Report for Chinese Application No. 201410089167.X dated Feb. 3, 2016, 9 pages.
English Translation of Chinese Office Action and Search Report for Chinese Application No. 201610832736.4 dated Mar. 22, 2018, 6 pages.
European Search Report for European Application No. 12196665.9 dated Mar. 6, 2013, 7 pages.
European Search Report for European Application No. 13159950.8 dated Jun. 6, 2013, 7 pages.
European Search Report for European Application No. 14156903.8 dated Jan. 27, 2015, 10 pages.
European Search Report for European Application No. 15152834.6 dated Oct. 8, 2015, 7 pages.
Gillespie, Thomas D.; "Fundamentals of Vehicle Dynamics"; Society of Automotive Engineers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Partial European Search Report for European Patent Application No. 14156903.8 dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; "Design of Horizontal Curves With Downgrades Using Low-Order Vehicle Dynamics Models", A Thesis by T Varunkikar; 2011; 141 pages.

\* cited by examiner

ELECTRIC POWER STEERING COLUMN ASSEMBLY

BACKGROUND OF THE INVENTION

Steering by wire steering columns may not have a mechanical connection between a steering wheel and a steering gear. The mechanical connection may be replaced by an artificial road feel device, typically a servomotor that is connected to a steering shaft that is connected to the steering gear. The servomotor provides road force feedback to the operator of the vehicle. The servomotor may also provide a force to indicate the end of steering wheel travel or lock to lock end stops. Unfortunately when the vehicle is powered down the steering wheel may easily rotate and rotate beyond the end of steering wheel travel or the lock to lock end stops.

SUMMARY OF THE INVENTION

According to an embodiment of the present disclosure an electric power steering column assembly is provided. The electric power steering column assembly includes a steering shaft and a travel stop assembly. The steering shaft extends along a steering axis. The steering shaft has a first end that is configured to attach to a steering wheel. The steering shaft has a second end that extends through a steering actuator. The travel stop assembly is disposed on the steering actuator. The travel stop assembly engages the second end of the steering shaft. The travel stop assembly is configured to inhibit rotation of the steering shaft.

According to another embodiment of the present disclosure a steer by wire steering column assembly is provided. The steer by wire steering column assembly includes a steering actuator, a steering shaft, and a travel stop assembly. The steering actuator has an end plate defining a recess. The steering shaft has a first end disposed opposite a second end. The second end is received within the steering actuator and is disposed proximate the end plate. The travel stop assembly includes a screw member that is disposed within the steering actuator. The screw member has a first portion that is at least partially received within the second end of the steering shaft. The screw member has a second portion that is at least partially received within the recess.

These and other advantages and features will become more apparent from the following description taken in conjunction with the drawings.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
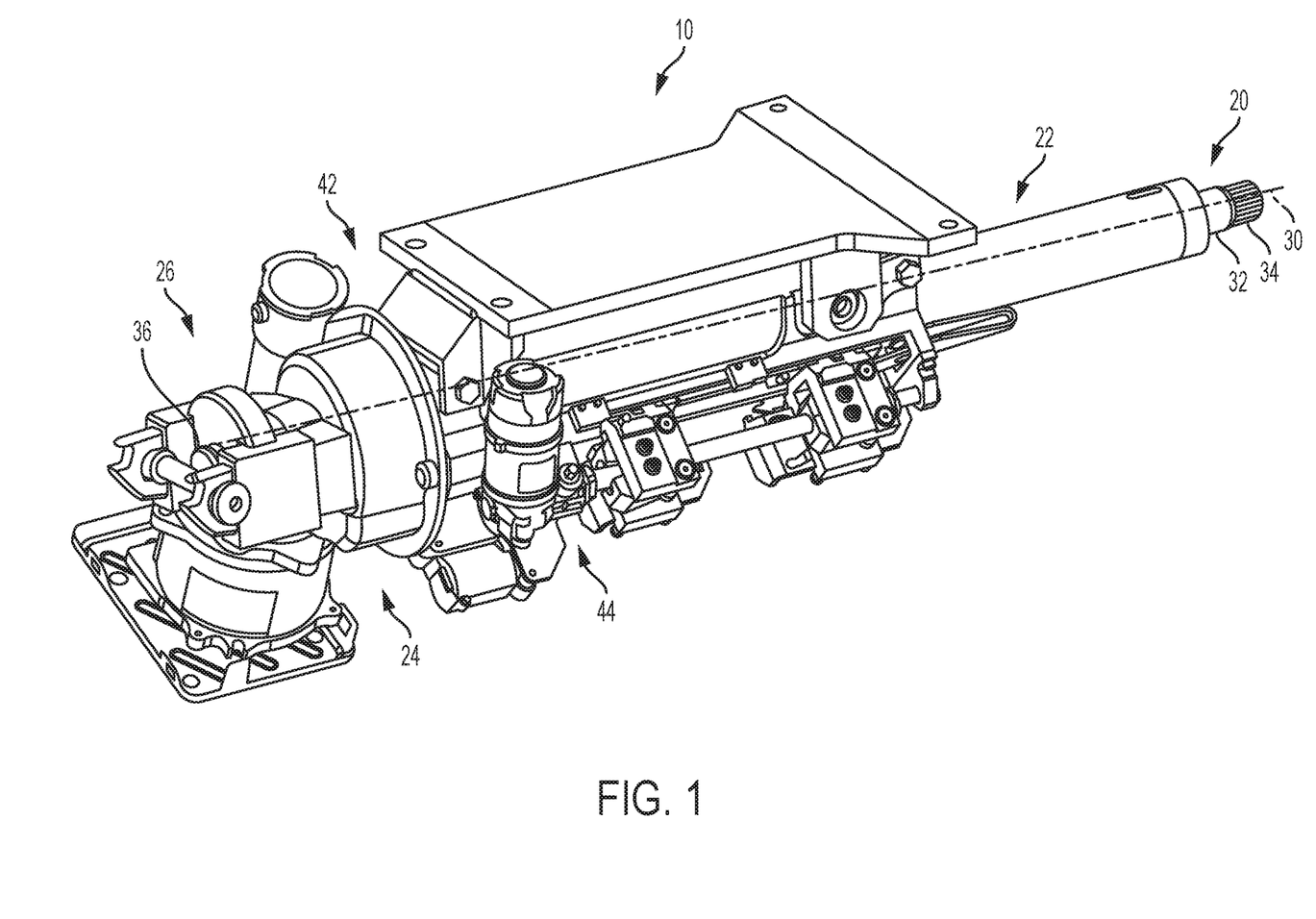
FIG. 1 is a perspective view of an electric power steering column assembly having a travel stop assembly.

Referring to FIG. 1, an electric power steering column assembly 10 is shown. The electric power steering column assembly 10 is provided with a vehicle. The electric power steering column assembly 10 includes a steering shaft 20, a jacket assembly 22, a steering actuator 24, and a travel stop assembly 26.

The steering shaft 20 extends along a steering axis 30. The steering shaft 20 extends at least partially through the jacket assembly 22, the steering actuator 24, and the travel stop assembly 26 along the steering axis 30. The steering shaft 20 includes a steering shaft body 32 that extends between a steering shaft first end 34 and a steering shaft second end 36. The steering shaft first end 34 is configured to attach to a steering wheel. The steering shaft second end 36 is configured to be operably connected to at least one of the steering actuator 24 and the travel stop assembly 26. The steering shaft second end 36 is provided with one or more threads 40.

The steering shaft 20 extends through the jacket assembly 22. The jacket assembly 22 is configured to carry or rotatably support the steering shaft 20. The jacket assembly 22 is configured to attach the electric power steering column assembly 10 to a vehicle structure. The jacket assembly 22 is attached to the vehicle structure by a mounting bracket 42.

The steering actuator 24 may be commonly referred to as "hand wheel actuator." The steering actuator 24 is configured as an electromechanical actuator that is mounted to at least one of an end of the jacket assembly 22 and a vehicle structure via the mounting bracket 42. The steering shaft second end 36 is received by and extends at least partially through the steering actuator 24. The steering actuator 24 replaces a direct mechanical connection between the steering shaft 20 and a steering gear operatively connected to a vehicle wheel with an electronic or virtual connection. The steering actuator 24 is configured to interpret a position of at least one of the steering shaft 20 and the steering wheel connected to the steering shaft first end 34 and to provide that position as a steering input to a steering gear operatively connected to a vehicle wheel to pivot the vehicle wheel. The steering actuator 24 is configured to provide a rotational input or other input to the steering shaft second end 36 to provide an artificial road feel to the operator of the vehicle.

In at least one embodiment, the steering actuator 24 is configured to provide a force opposing rotation of the steering shaft 20 to indicate the end of wheel travel when the vehicle is on and operational. The end of wheel travel is indicative of the maximum amount of steering wheel rotation and/or vehicle wheel rotation to steer the vehicle. The steering actuator 24 may not provide the force opposing rotation of the steering shaft 20 to indicate the end of wheel travel, when the vehicle is off and not operational. The travel stop assembly 26 is configured as a physical turn limiter for at least one of the steering shaft 20 and the steering wheel attached to the steering shaft first end 34.

Figure 2:
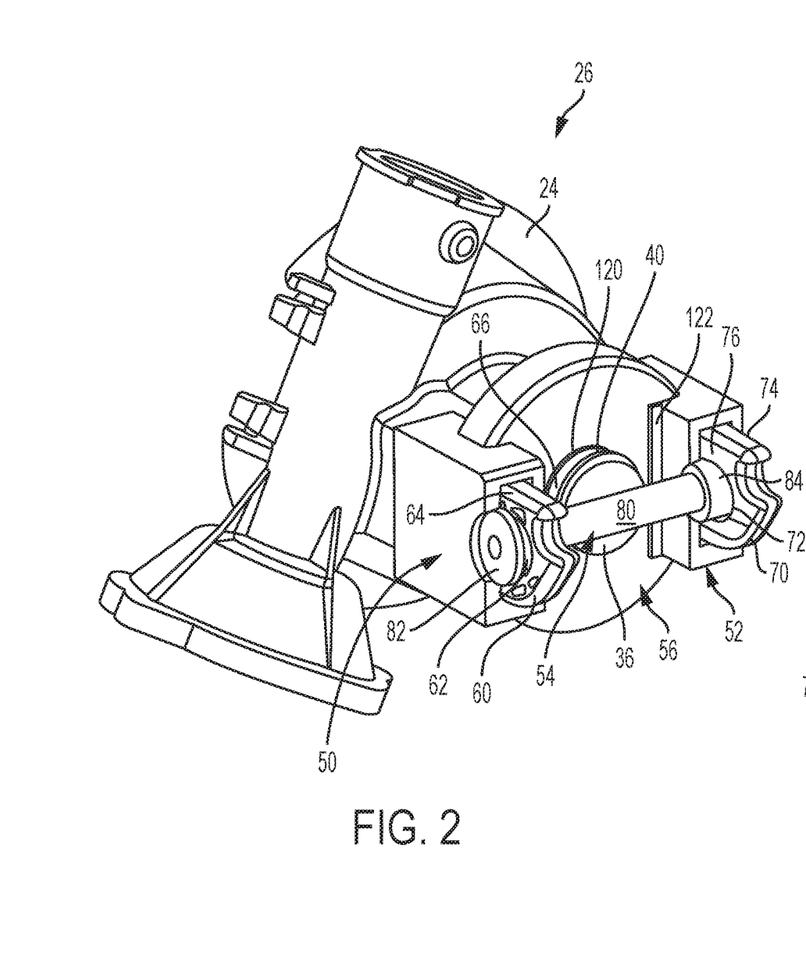
FIG. 2 is a perspective view of the travel stop assembly.
Figure 3:
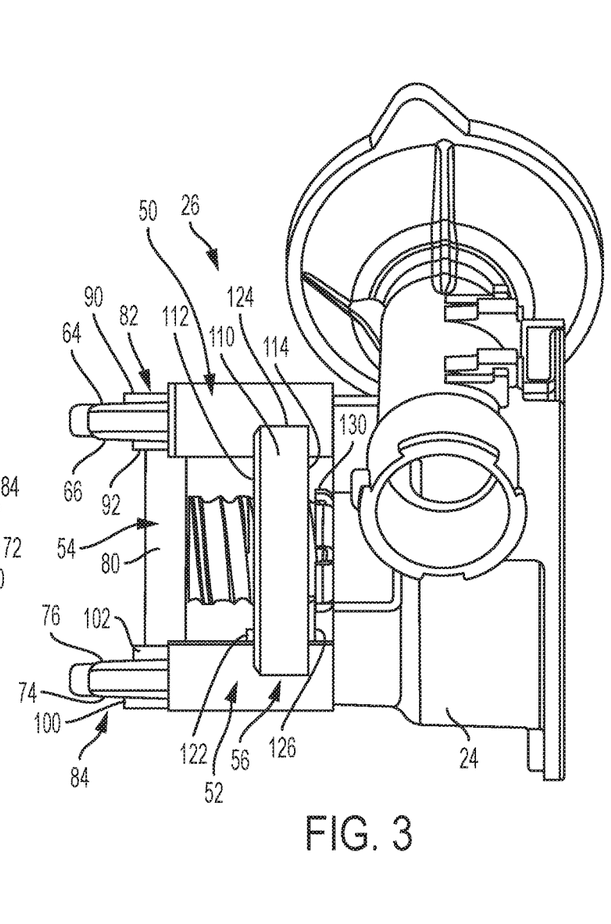
FIG. 3 is a plan view of the travel stop assembly.

Referring to FIG. 1-3, the travel stop assembly 26 is disposed on the steering actuator 24. The travel stop assembly 26 is configured to engage the steering shaft second end 36. The travel stop assembly 26 is configured to inhibit rotation of the steering shaft 20 in a first direction or a second direction in response to the steering shaft 20 being rotated through a predetermined steering angle or a predetermined number of rotations/turns in either the first direction or the second direction. The travel stop assembly 26 includes a first mounting arm 50, a second mounting arm 52, a member 54, and a travel nut 56.

The first mounting arm 50 is disposed on the steering actuator 24. The first mounting arm 50 extends from the steering actuator 24 and includes a first mounting arm distal end 60 having a first mounting arm opening 62. The first mounting arm opening 62 extends completely through the first mounting arm distal end 60 from a first mounting arm first side 64 to a first mounting arm second side 66.

The second mounting arm 52 is disposed on the steering actuator 24. The second mounting arm 52 is spaced apart from the first mounting arm 50. The second mounting arm 52 is disposed substantially parallel to the first mounting arm 50. The second mounting arm 52 extends from the steering actuator 24. The second mounting arm 52 includes a second mounting arm distal end 70 having a second mounting arm opening 72. The second mounting arm opening 72 extends completely through the second mounting arm distal end 70 from a second mounting arm first side 74 to a second mounting arm second side 76. The second mounting arm opening 72 is disposed substantially coaxially with the first mounting arm opening 62.

The member 54 extends between the first mounting arm 50 and the second mounting arm 52. The member 54 extends through the first mounting arm opening 62 and the second mounting arm opening 72. The member 54 is disposed proximate the steering shaft second end 36. The member 54 includes a member body 80 that extends between a first member end 82 and the second member end 84.

The first member end 82 is at least partially received within the first mounting arm opening 62. The first member end 82 includes a first member first retaining feature 90 and a first member second retaining feature 92. The first member first retaining feature 90 is disposed proximate the first mounting arm first side 64. The first member second retaining feature 92 is spaced apart from the first member first retaining feature 90. The first member second retaining feature 92 is disposed proximate the first mounting arm second side 66 such that the first member first retaining feature 90 and the first member second retaining feature 92 are disposed on opposite sides of the first mounting arm 50.

The second member end 84 is at least partially received within the second mounting arm opening 72. The second member end 84 includes a second member first retaining feature 100 and a second member second retaining feature 102. The second member first retaining feature 100 is disposed proximate the second mounting arm first side 74. The second member second retaining feature 102 is spaced apart from the second member first retaining feature 100. The second member second retaining feature 102 is disposed proximate the second mounting arm second side 76 such that the second member first retaining feature 100 and the second member second retaining feature 102 are disposed on opposite sides of the second mounting arm 52.

The travel nut 56 is disposed between the first mounting arm 50 and the second mounting arm 52. The travel nut 56 is threadedly mounted to the steering shaft second end 36. The travel nut 56 includes a travel nut body 110 that extends between a first face 112 and a second face 114.

The first mounting arm 50 and the second mounting arm 52 engage the travel nut body 110 to inhibit rotation of the travel nut 56 as the steering shaft second end 36 rotates relative to the travel nut 56. The travel nut body 110 defines a central opening 120. The central opening 120 extends from the first face 112 to the second face 114. The central opening 120 includes one or more complementary threads configured to meshingly engage the one or more threads 40 of the steering shaft second end 36.

The first face 112 is disposed opposite the second face 114. The first face 112 faces towards the member 54. The first face 112 is a generally planar surface having a first projection 122. The first projection 122 is disposed proximate an outer periphery 124 of the travel nut 56. The first projection 122 has a first width. In at least one embodiment, the first projection 122 is configured as an inclined surface. The inclined surface is inclined towards the outer periphery 124 of travel nut 56 such that the inclined surface has a maximum height proximate the outer periphery and a decreasing height that decreases in a direction that extends from the outer periphery 124 towards the central opening 120.

The second face 114 faces towards the steering actuator 24. The second face 114 is a generally planar surface having a second projection 126. The second projection 126 is disposed proximate the outer periphery 124 of the travel nut 56. The second projection 126 is disposed opposite the first projection 122. The second projection 126 has a second width that is greater than the first width. In at least one embodiment, the second projection 126 is configured as an inclined surface. The inclined surface is inclined or angled towards the outer periphery 124 the travel nut 56 such that the inclined surface has a maximum height proximate the outer periphery 124 and a decreasing height that decreases in a direction that extends from the outer periphery 124 towards the central opening 120.

Referring to FIG. 2, the steering shaft 20 rotates in a first direction in response to the rotation of the steering wheel attached to the steering shaft first end 34 being rotated in the first direction about the steering axis 30. The rotation of the steering shaft 20 causes the steering shaft second end 36 to rotate in the first direction relative to the travel nut 56. The rotation of the steering shaft second end 36 in the first direction causes the travel nut 56 to travel axially along the steering shaft second end 36, without rotating, towards the member 54.

The member 54 is configured as a first end stop that inhibits further translation of the travel nut 56 relative to the steering shaft second end 36 when the travel nut 56 engages the member 54. For example, when the first projection 122 engages the member 54 the combination of the travel nut 56 and the member 54 inhibit further rotation of the steering shaft second end 36 and ultimately the steering shaft 20 about the steering axis 30 in the first direction.

The engagement between the first projection 122 and the member 54 pivots or twists the travel nut 56 about an axis disposed transverse to the steering axis 30. The twisting of the travel nut 56 about the axis disposed transverse to the steering axis 30 causes an overturning moment that prevents the travel nut 56 from binding. In at least one embodiment, the travel nut 56 of the travel stop assembly 26 enables the steering wheel attached to the steering shaft first end 34 to be rotated through 2½ rotations from the opposite end stop in the first direction prior to the travel nut 56 of the travel stop assembly 26 inhibiting further rotation of the steering shaft 20 in the first direction.

Referring to FIG. 3, the steering shaft 20 rotates in a second direction, opposite the first direction, in response to the rotation of the steering wheel attached to the steering shaft first end 34 being rotated in the second direction about the steering axis 30. The rotation of the steering shaft 20 causes the steering shaft second end 36 to rotate relative to the travel nut 56. The rotation of the steering shaft second end 36 causes the travel nut 56 to travel axially along the steering shaft second end 36, without rotating, towards the steering actuator 24.

At least one of the steering actuator 24 and an end stop nut 130 configured as a second end stop that inhibits further translation of the travel nut 56 relative to the steering shaft second end 36 when the travel nut 56 engages at least one of the steering actuator 24 and the end stop nut 130. The end stop nut 130 is configured as a nut that is disposed about the steering shaft second end 36 and is disposed proximate the steering actuator 24. For example, when the second projection 126 engages at least one of the steering actuator 24 and the end stop nut 130, the combination of the travel nut 56 and at least one of the steering actuator 24 and the end stop nut 130 inhibit further rotation of the steering shaft second end 36 and ultimately the steering shaft 20 in the second direction.

The engagement between the second projection 126 and the member 54 pivots or twists the travel nut 56 about the axis disposed transverse to the steering axis 30. The twisting of the travel nut 56 about the axis disposed transverse to the steering axis 30 causes an overturning moment that prevents the travel nut 56 from binding. In at least one embodiment, the travel nut 56 of the travel stop assembly 26 enables the steering wheel attached to the steering shaft first end 34 to be rotated through 2½ rotations in the second direction prior to the travel nut 56 of the travel stop assembly 26 inhibiting further rotation of the steering shaft 20 in the second direction.

Figure 4:
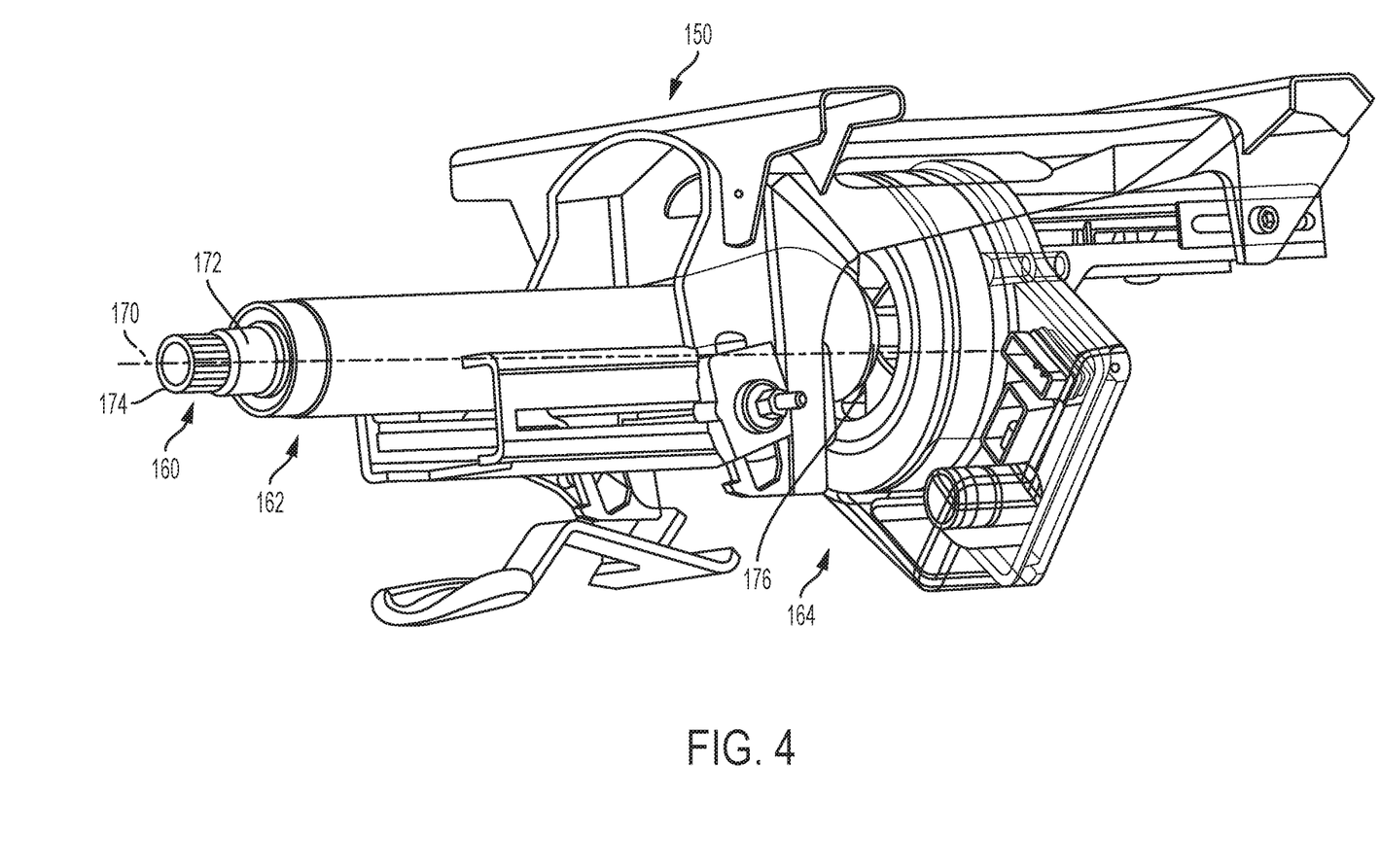
FIG. 4 is a perspective view of a steer by wire steering column assembly having a travel stop assembly.
Figure 5:
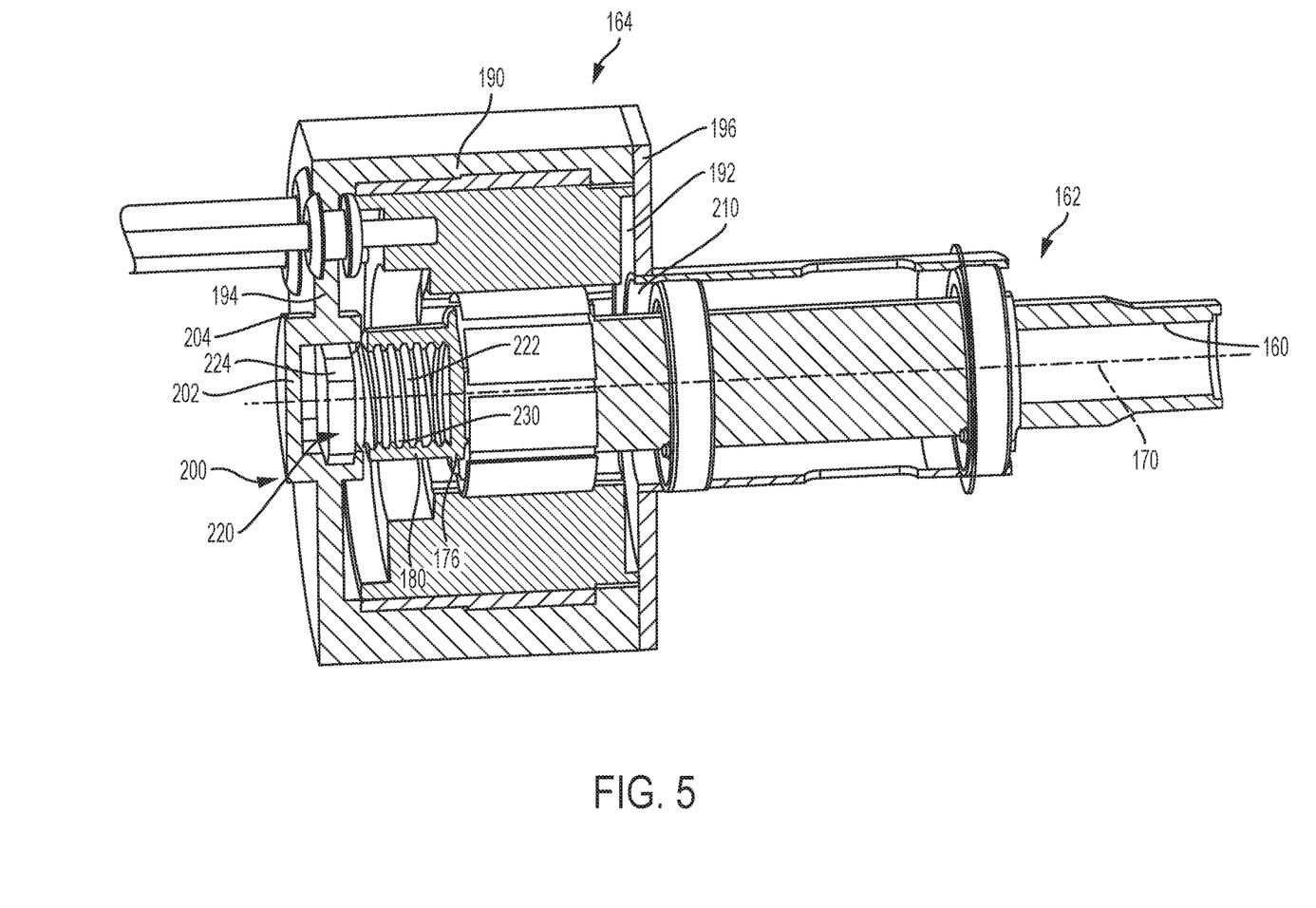
FIG. 5 is a partial cross-sectional view of the steer by wire steering column assembly.

Referring to FIGS. 4 and 5, a steer by wire steering column assembly 150 is shown. The steer by wire steering column assembly 150 is provided with a vehicle. The steer by wire steering system is configured to steer or pivot a set of vehicle wheels based on rotation of a steering wheel through an electronic or other non-mechanical connection between the steering wheel and the vehicle wheels. The steer by wire steering column assembly 150 includes a steering shaft 160, a jacket assembly 162, a steering actuator 164, and a travel stop assembly 166.

The steering shaft 160 extends along a steering axis 170. The steering shaft 160 extends at least partially through the jacket assembly 162 and is received within the steering actuator 164. The steering shaft 160 includes a steering shaft body 172 extending between a steering shaft first end 174 and a steering shaft second end 176 disposed opposite the steering shaft first end 174. The steering shaft first end 174 is configured to attach to a steering wheel. The steering shaft second end 176 is configured to be operably connected to at least one of the steering actuator 164 and the travel stop assembly 166. The steering shaft second end 176 is configured as a hollow end that is provided with a set of threads 180. The set of threads 180 may be configured as internal threads or female threads.

The steering shaft 160 extends through the jacket assembly 162 along the steering axis 170. The jacket assembly 162 is configured to carry or rotatably support the steering shaft 160. The jacket assembly 162 is configured to attach the steer by wire steering column assembly 150 to a vehicle structure. The jacket assembly 162 is attached to the vehicle structure by a mounting bracket 182. In at least one embodiment, the jacket assembly 162 is operably connected to the steering actuator 164.

The steering actuator 164 may be commonly referred to as "hand wheel actuator." The steering actuator 164 is configured as an electromechanical actuator that is mounted to at least one of an end of the jacket assembly 162 and a vehicle structure through a mounting bracket. The steering actuator 164 includes a steering actuator housing 190. The steering actuator housing 190 defines an opening 192 configured to receive the electromechanical actuator components. The steering actuator housing 190 includes an end plate 194 and a closure plate 196.

The end plate 194 defines a recess 200. The recess 200 includes an end wall 202 and at least one sidewall 204. The end wall 202 is disposed substantially parallel to the end plate 194. The end wall 202 extends beyond the end plate 194. The at least one sidewall extends from the end wall 202 towards the closure plate 196. The at least one sidewall 204 is disposed substantially perpendicular to the end wall 202. The at least one sidewall 204 extends through the end plate 194.

The closure plate 196 is disposed substantially parallel to the end plate 194. The closure plate 196 covers the opening 192 of the steering actuator housing 190. The closure plate 196 defines a closure plate opening 210. The steering shaft second end 176 extends through the closure plate opening 210 and is received within the opening 192 of the steering actuator housing 190. The steering shaft second end 176 is disposed proximate the end plate 194. The steering shaft second end 176 is disposed proximate the at least one sidewall 204.

The travel stop assembly 166 is disposed within the opening 192 of the steering actuator housing 190. The travel stop assembly 166 is disposed between the end plate 194 and the steering shaft second end 176. The travel stop assembly 166 includes a screw member 220. The screw member 220 includes a first portion 222 and a second portion 224.

The first portion 222 is at least partially received within the steering shaft second end 176. The first portion 222 is configured as a threaded member having a complementary set of threads 230. The complementary set of threads 230 are in threaded engagement with the set of threads 180 of the steering shaft second end 176. The complementary set of threads 230 may be configured as external threads or male threads.

The second portion 224 is at least partially received within the recess 200 of the end plate 194. The at least one sidewall 204 is configured to engage the second portion 224 to inhibit rotation of the screw member 220 while the steering shaft second end 176 rotates relative to the screw member 220.

The steering shaft 160 rotates in a first direction in response to the rotation of the steering wheel attached to the steering shaft first end 174 being rotated in the first direction about the steering axis 170. The rotation of the steering shaft 160 causes the steering shaft second end 176 to rotate in the first direction relative to the screw member 220. The rotation of the steering shaft second end 176 in the first direction causes the screw member 220 to travel axially along the steering shaft second end 176, without rotating, towards the end wall 202.

The end wall 202 is configured as a first end stop that inhibits further translation of the screw member 220 relative to the steering shaft second end 176 when the screw member 220 engages the end wall 202. For example, the screw member 220 engages the end wall 202; the screw member 220 inhibits further rotation of the steering shaft second end 176 and ultimately the steering shaft 160 about the steering axis 170 in the first direction.

The steering shaft 160 rotates in a second direction, opposite the first direction, in response to the rotation of the steering wheel attached to the steering shaft first end 174 being rotated in the second direction about the steering axis 170. The rotation of the steering shaft 160 causes the steering shaft second end 176 to rotate relative to the screw member 220. The rotation of the steering shaft second end 176 causes the screw member 220 to travel axially along the steering shaft second end 176, without rotating, towards the steering shaft first end 174.

The engagement between the second portion 224 and an end of the steering shaft second end 176 or engagement between the first portion 222 and an end of the hollow portion of the steering shaft second end 176 is configured as an end stop to inhibit further translation of the screw member 220 relative to the steering shaft second end 36. The inhibition of further translation of the screw member 220 inhibits further rotation of the steering shaft second end 176 and ultimately the steering shaft 160 about the steering axis 170 in the second direction.

Throughout this specification, the term "attach," "attachment," "connected", "coupled," "coupling," "mount," or "mounting" shall be interpreted to mean that a structural component or element is in some manner connected to or contacts another element, either directly or indirectly through at least one intervening structural element, or is integrally formed with the other structural element.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments or combinations of the described embodiments. Accordingly, the present disclosure is not to be seen as limited by the foregoing description.

Having thus described the present disclosure, it is claimed:

1. An electric power steering column assembly, comprising:
    a steering shaft extending along a steering axis, the steering shaft having a first end configured to attach to a steering wheel and a second end extending through a steering actuator; and
    a travel stop assembly comprising:
        a first mounting arm extending from the steering actuator;
        a second mounting arm spaced apart from the first mounting arm, extending from the steering actuator; and
        a member extending between the first mounting arm and the second mounting arm.

2. The electric power steering column assembly of claim 1, wherein the travel stop assembly comprising:
    a travel nut disposed between the first mounting arm and the second mounting arm, the travel nut is threadedly mounted to the second end of the steering shaft.

3. The electric power steering column assembly of claim 2, wherein the travel nut includes a first face disposed opposite a second face and a travel nut body extending between the first face and the second face.

4. The electric power steering column assembly of claim 3, wherein the first mounting arm and the second mounting arm engage the travel nut body.

5. The electric power steering column assembly of claim 3, wherein the first face faces towards the member and the second face faces towards the steering actuator.

6. The electric power steering column assembly of claim 5, wherein the first face defines a first projection that extends towards the member.

7. The electric power steering column assembly of claim 6, wherein in response to rotation of the steering shaft, relative to the travel nut, about the steering axis in a first direction, the travel nut travels along the second end of the steering shaft towards the member.

8. The electric power steering column assembly of claim 7, wherein in response to engagement between the first projection and the member, further rotation of the steering shaft in the first direction is inhibited.

9. The electric power steering column assembly of claim 6, wherein the second face defines a second projection that extends towards the steering actuator.

10. The electric power steering column assembly of claim 9, wherein in response to rotation of the steering shaft, relative to the travel nut, about the steering axis in a second direction, the travel nut travels along the second end of the steering shaft towards the steering actuator.

11. The electric power steering column assembly of claim 10, wherein in response to engagement between the second projection and an end stop disposed proximate the steering actuator, further rotation of the steering shaft in the second direction is inhibited.

12. A steer by wire steering column assembly, comprising:
    a steering actuator having an end plate defining a recess;
    a steering shaft having a first end disposed opposite a second end, the second end is received within the steering actuator, the second end disposed proximate the end plate; and
    a travel stop assembly including a screw member disposed within the steering actuator, the screw member having a first portion at least partially received within the second end of the steering shaft and a second portion at least partially received within the recess.

13. The steer by wire steering column assembly of claim 12, wherein the second end of the steering shaft is provided with a set of threads and the first portion of the screw member is provided with a complementary set of threads in threaded engagement with the set of threads.

14. The steer by wire steering column assembly of claim 13, wherein the recess of the end plate includes an end wall and at least one sidewall extending from the end wall and disposed substantially perpendicular to the end wall.

15. The steer by wire steering column assembly of claim 14, wherein the at least one sidewall is configured to engage the second portion of the screw member to inhibit rotation of the screw member.

16. The steer by wire steering column assembly of claim 15, wherein in response to rotation of the steering shaft in a first direction relative to the screw member, the screw member travels along the second end of the steering shaft towards the end wall.

17. The steer by wire steering column assembly of claim 16, wherein engagement between the second portion of the screw member and the end wall of the end plate inhibits further rotation of the steering shaft in the first direction.

18. The steer by wire steering column assembly of claim 17, wherein in response to rotation of the steering shaft in a second direction opposite the first direction relative to the screw member, the screw member travels along the second end of the steering shaft towards the first end of the steering shaft.

19. The steer by wire steering column assembly of claim 18, wherein engagement between the first portion of the screw member and an end stop of the second end of the steering shaft inhibits further rotation of the steering shaft in the second direction.

* * * * *